Figure 1:
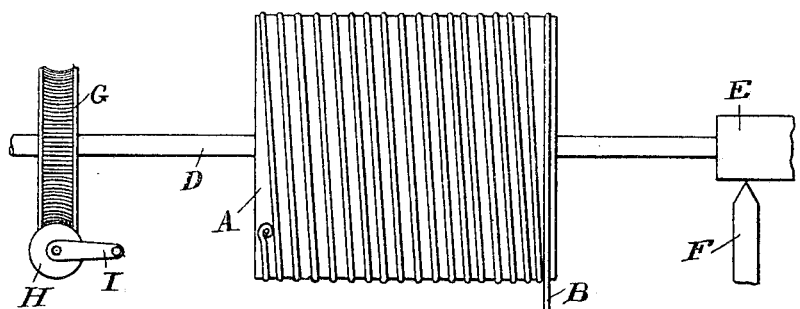

No. 798,665. PATENTED SEPT. 5, 1905.
A. L. DE LEEUW.
SPEED CHANGING MECHANISM FOR POWER TRANSMISSION.
APPLICATION FILED JULY 9, 1904.

4 SHEETS—SHEET 1.

Witnesses:
Herbert F. Harden
Henry N. Bauer

Inventor:
Adolph L. de Leeuw
by W. F. Herbslet, his attorney

No. 798,665. PATENTED SEPT. 5, 1905.
A. L. DE LEEUW.
SPEED CHANGING MECHANISM FOR POWER TRANSMISSION.
APPLICATION FILED JULY 9, 1904.

4 SHEETS—SHEET 3.

Witnesses:
Herbert F. Harden
Henry N. Bauer

Inventor:
Adolph L. De Leeuw,
by H. E. Herbsleb, his Attorney.

No. 798,665. PATENTED SEPT. 5, 1905.
A. L. DE LEEUW.
SPEED CHANGING MECHANISM FOR POWER TRANSMISSION.
APPLICATION FILED JULY 9, 1904.

4 SHEETS—SHEET 4.

Witnesses:
Herbert F. Harden
Henry N. Bauer

Inventor:
Adolph L. De Leeuw,
by N. F. Herbslet, His Attorney.

UNITED STATES PATENT OFFICE.

ADOLPH L. DE LEEUW, OF HAMILTON, OHIO.

SPEED-CHANGING MECHANISM FOR POWER TRANSMISSION.

No. 798,665.　　Specification of Letters Patent.　　Patented Sept. 5, 1905.

Application filed July 9, 1904. Serial No. 215,887.

*To all whom it may concern:*

Be it known that I, ADOLPH L. DE LEEUW, a citizen of the United States, residing at Hamilton, in the county of Butler and State of Ohio, have invented certain new and useful Improvements in Speed-Changing Mechanism for Power Transmission, of which the following is a specification.

It is the object of my invention to provide a speed-changing mechanism for power transmission in which the controlling devices for effecting speed change are relieved of direct subjection to the strain of power transmission; further, in providing a speed-changing mechanism for power transmission in which the change of speed is effected by auxiliary devices acting upon the main power-transmitting devices; further, in providing a speed-changing mechanism for power transmission in which the torque of the driven member shall be in inverse proportion to its speed, but without changing of the gear ratios between the driving member and the driven member; further, in providing a speed-changing mechanism for power transmission in which the driven member is driven at speeds which represent the difference between two elements, one of which has a relatively constant speed and the other has a speed variable with relation to said constant speed, the latter being controlled by a relieving member acting thereon, with a variable-speed control for the relieving member, and so constructed and arranged as to permit very wide range of speed in the driven member without compelling an excessively wide range in the variable-speed control, and, further, in providing such mechanism with a speed control comprising two parallel shafts, each having gears thereon, the said gears being normally out of mesh, the number of teeth of each two opposing gears on the respective shafts varying; said respective opposing gears being engaged by intermediate gears for changing speed, whereby it is possible to vary the speeds of the driven member by very small steps without necessitating the employment of very large gears.

My invention will be readily understood from the following description and claims and from the drawings, in which—

Figure 2:
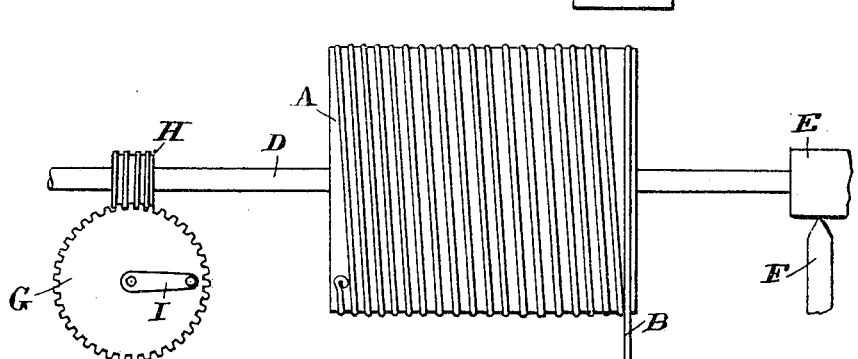
Figure 3:
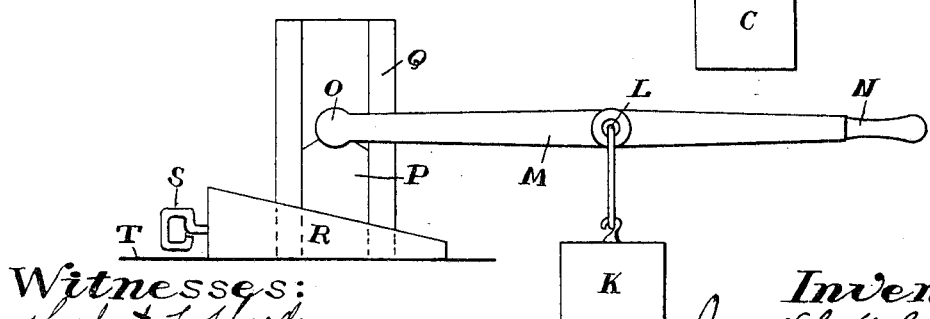
Figure 4:
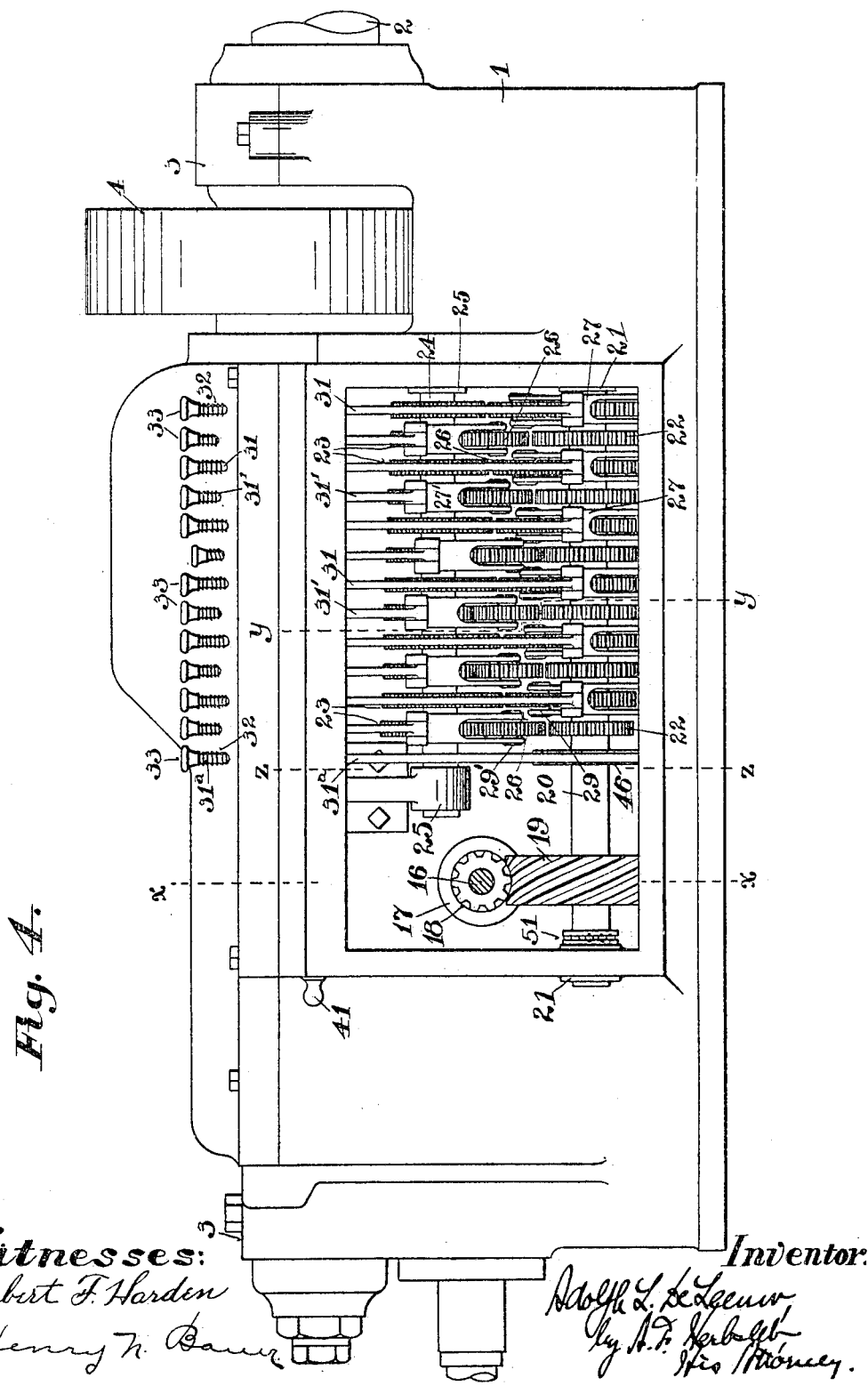
Figure 5:
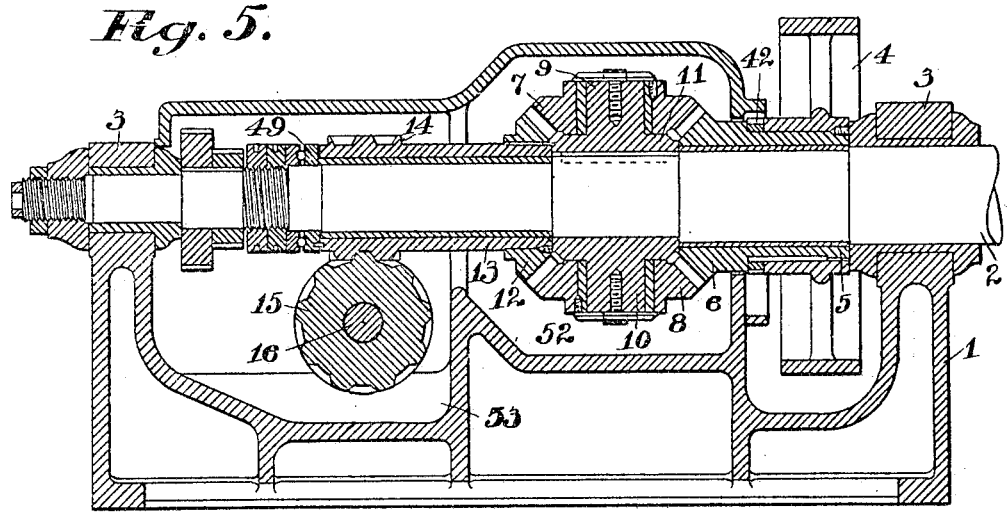
Figure 6:
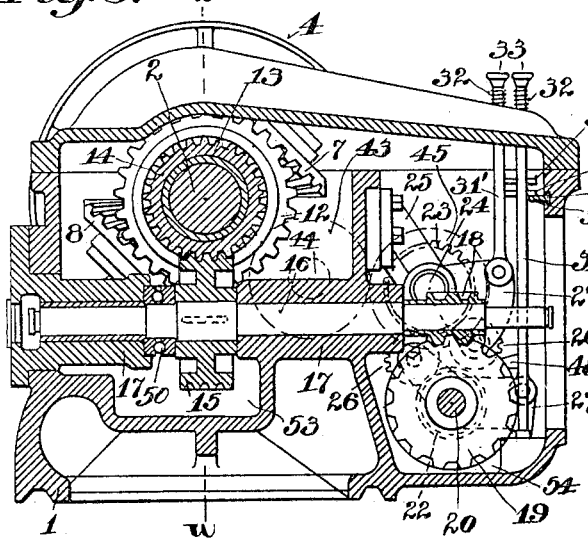
Figure 7:
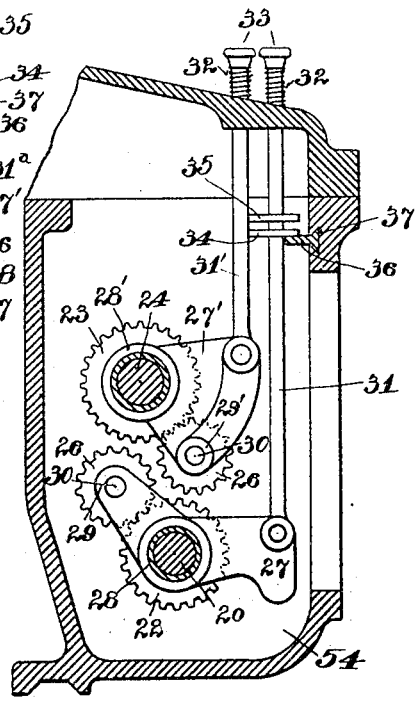
Figure 10:
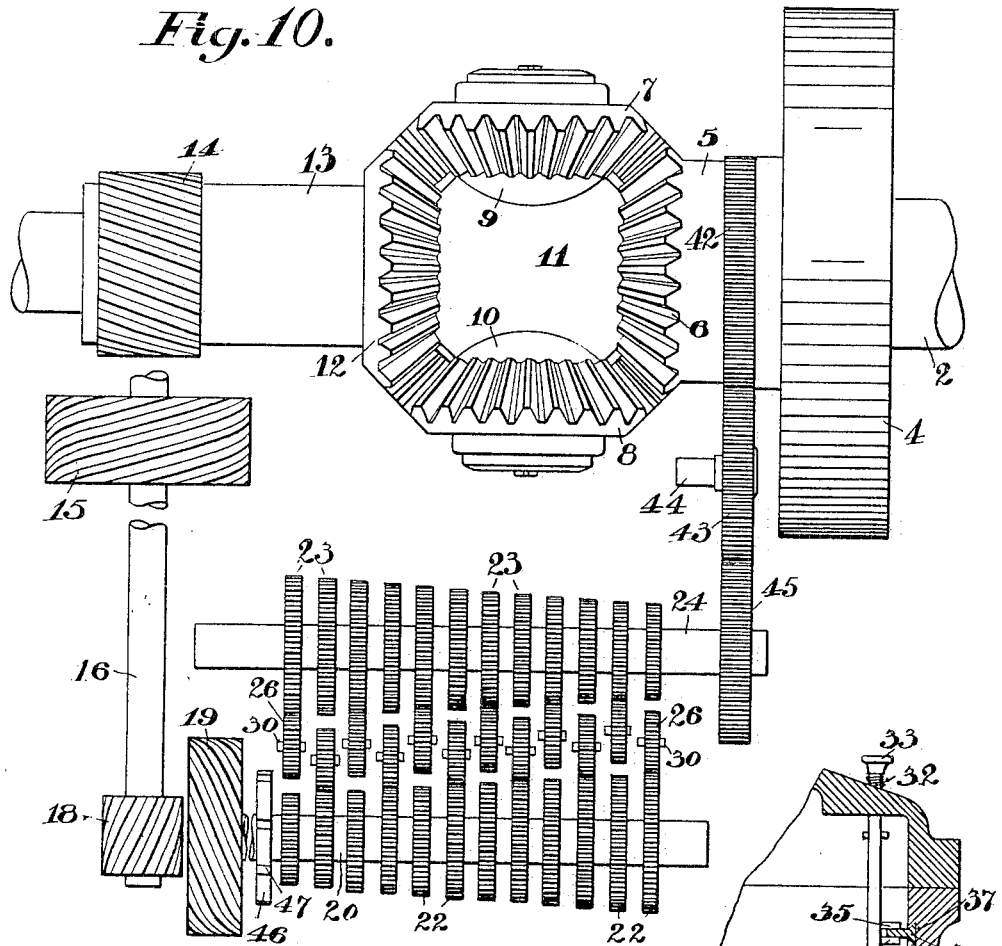
Figure 9:
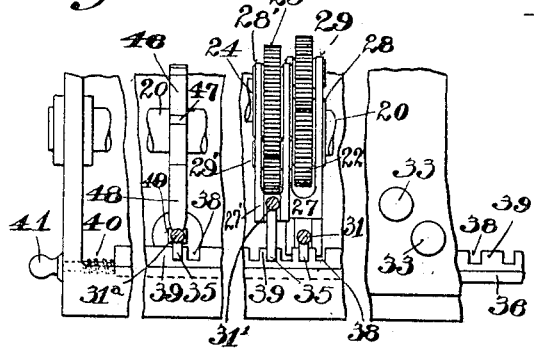
Figure 8:
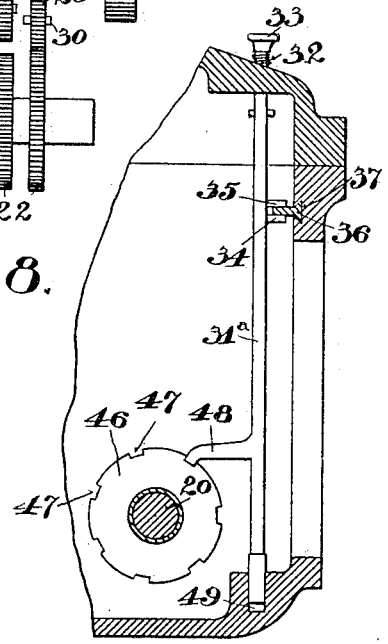

Figures 1 and 2 are front elevations of crude models illustrating a rudimentary principle of my invention. Fig. 3 is a front elevation of a rudimentary model illustrating a principle of operation of my invention. Fig. 4 is a front elevation of my improved device. Fig. 5 is a vertical longitudinal section taken through the axis of the driven shaft on the line *w w* of Fig. 6, but showing the studs for the intermediate bevel-gears in vertical position. Fig. 6 is a cross-section of my improved device on the line *x x* of Fig. 4. Fig. 7 is a cross-section on the line *y y* of Fig. 4, illustrating the construction of the speed-variator. Fig. 8 is a cross-section on the line *z z* of Fig. 4, illustrating the construction of the lock for the speed-variator. Fig. 9 is a plan view, partly broken away, illustrating the construction of the speed-variator; and Fig. 10 is a diagrammatic view of the gearing of my improved device.

Illustrating the principle of my invention in so far as it relates to the speed-controlling devices being relieved of direct subjection to the strain of power transmission and referring to Fig. 1, it may be assumed that A represents a drum about which a rope B is wound, one end of the rope being secured to the drum, the other end having a weight C attached thereto, by means of which the drum is turned. D is the shaft, to which the drum is secured, and E a piece of work which it may be assumed is to be turned by a tool F, suitable devices being provided for feeding the tool, the weight being sufficiently heavy to cause turning of the work for performing the cutting action against the resistance of the tool F. If no other parts were present to qualify the action of the parts mentioned, the tool would perform its cutting operation as long as the rope would unwind, due to the action of the weight. It will be assumed, however, that a worm-wheel G is secured to the shaft D, a worm H meshing with the worm-wheel, the teeth of the worm and worm-wheel being nearly parallel with the shaft. The worm-wheel and worm being in mesh would cause a lock upon the shaft and effectually prevent turning of the shaft in spite of the pull of the weight upon it. It will now be assumed that some turning agency is caused to act upon the worm for turning the worm-wheel in the direction of normal rotation of the shaft D. This will cause release of the lock upon the shaft to the extent of the turning of the worm and permit the weight to descend, causing transference of the full power of the weight to the point of the tool at the speed permitted by the turning of the worm and in exact proportion as the turning of the worm permits rotation of the shaft D. If, for instance, a handle I be attached to the shaft of the worm, the rapidity with which that handle is turned will govern the speed of the drum and shaft and the speed at which the work traverses the cutter at full application of the power in the weight. It will be seen, further, that the worm, requiring a full revolution about its axis for the advance of each tooth on the worm-wheel, must be revolved with excessive rapidity for permitting only normal speed in rotation of the shaft D.

Referring to Fig. 2, the same parts are shown as in Fig. 1, except that the worm and worm-wheel have been transposed, the worm H being placed on the shaft D, the worm-wheel meshing therewith, the teeth of the worm and worm-wheel being nearly at right angles to the shaft D. So arranged the worm and worm-wheel can offer little resistance to the turning of the shaft D, even if great counter-force be applied to the handle I. It may be assumed, further, that between these extremes of relation of worm and worm-wheel there is a point at which the power of the weight would just overcome the resistance to the turning of the shaft and that if, for instance, spiral gears were substituted for the worm and worm-wheel the angle of the teeth of the spiral gears could be so arranged that their angle of power would just overbalance their angle of resistance, which would result in a device in which little resistance would be required at the handle I to prevent turning of the shaft D and would also permit comparative rapidity of turning of the shaft D without excessively rapid turning of the handle I for relieving that shaft and permitting full application of the power of the weight at the cutting-point of the tool F at the speed permitted by the speed of the handle I.

Illustrating the further principle of my invention that the torque of the driven member is in inverse proportion to its speed without change of gear ratios between the driving and driven members and referring to Fig. 3, it may be assumed that K is a weight to be lifted and is hung from a point L of a lever M, that power is applied to the handle N, and that the fulcrum of the lever is at O. If no other parts were present, the ratio of the power to be applied and the weight to be lifted would be as the lengths of the lever-arms N O and L O. This might be expressed somewhat differently, thus: The ratio between the power to be applied and the weight to be lifted is as the distances traveled by the weight and the power and in the direction in which the weight is to be moved. It is assumed that the fulcrum O rests on the block P, which is guided in a vertical plane by the slide Q, and that this block P rests on a wedge R, provided with a handle S, the wedge resting in turn on a horizontal support T. The angle of the wedge is so chosen that the weight resting on it is just able to push the wedge back, but that an infinitesimal resistance applied to the handle S will prevent this backward motion of the wedge. Some agency might be applied to the handle which will permit the wedge to slide back with any desired speed. In doing so fulcrum O will drop, and the weight K will drop also, thus partly neutralizing the lifting action given to the weight by the power applied to the handle N. To illustrate this principle by a numerical example, it will be assumed that the lever-arms N L and O L are equal. It will be further assumed that the fulcrum O is held stationary and that the weight K is one thousand pounds. Then the force applied to the handle N to raise the weight must be five hundred pounds, and if this handle is lifted, say, twelve inches the weight K will be lifted six inches. If now the wedge R is permitted at the same time to slide back such an amount as to make block P drop eight inches, then the weight K will be lifted only two inches, which is half the difference between twelve and eight. As the power has moved through a distance of twelve inches and the resistance has moved two inches, the power needs to be only two-twelfths of one thousand pounds, which is one hundred and sixty-six and two-thirds pounds instead of five hundred pounds, and this result is obtained without a change in the lever-arms N O and L O, but by allowing the fulcrum to move in the direction of the resistance.

Having explained the principles underlying my invention and referring now to the other figures in the drawings, I have in the present exemplification of my invention illustrated it as applied to the head-stock of a lathe for changing the speed of the spindle, although it is obvious that it can be employed in other relations—for instance, in changing the speed of the lead-screw in an engine-lathe or screw-cutting machine, in drills and other metal-working machines, in automobiles, hoists and cranes, and in other devices.

1 is the head-stock and may represent the frame or housing of my improved device. A spindle 2, being the driven shaft or member, is journaled in bearings 3 3 in the frame. The driving member is represented by a pulley 4, mounted upon the hub 5 of a bevel-gear 6, journaled about the shaft and held against endwise movement thereon. This bevel-gear meshes with bevel-gears 7 8, journaled upon studs 9 10 of a hub 11, rigidly secured to the shaft 2. The bevel-gears 7 8 mesh with a bevel-gear 12. This construction and arrangement of bevel-gears substantially forms what is known as a "jack-in-the-box" gear and is illustrated as comprising the main or primary power-transmitting means in the present exemplification of my invention, although it is obvious that any suitable arrangement of differential gearing may be employed for the purpose.

I have mounted the bevel-gear 12 on a sleeve 13, journaled about the shaft 2 and held against endwise movement thereon. The bevel-gear 12 may be termed an "anchor" or controlling member, and if it is stationary the power transmission will be from the pulley 4 through the jack-in-the-box to the shaft 2, resulting in a shaft speed of one-half the pulley speed, owing to the reducing effect of the jack-in-the-box on the speed. I desire, however, to vary the speed of the driven shaft while maintaining a relatively constant speed in the driving member, and I desire also that the speed control shall be relieved of the strain of the power transmission. For this purpose I provide a suitable auxiliary speed-variator having any desirable source of power and interpose a power interrupting or retarding member between the speed-variator and the anchor member. I prefer also that the angle of power application of the power interrupting or retarding member shall but slightly overcome its angle of power resistance. Thus the sleeve 13 is provided with a spiral gear 14, meshing with a spiral gear 15 on a shaft 16, journaled in bearings 17 17 on the frame. The shaft 16 is provided with a spiral gear 18, meshing with a spiral gear 19 on a shaft 20, journaled in bearings 21 21 on the frame. The teeth of these spiral gears are preferably so angled that the angle of power will just about overcome the angle of resistance and just permit transmission from the driving agency through said gears to the shaft 20 for permitting the latter to turn, thereby forming a power-relieving member. The teeth of these spiral gears may be likened to inclined planes, as referred to in explaining Fig. 3, the teeth of the gears 14 and 18 corresponding to the inclined face of block P and representing the acting or advancing inclined plane or element, the teeth of the gears 15 and 19 corresponding to the inclined face of the wedge R and representing the resisting or receding inclined plane or element, the angles of the inclines being so chosen that the latter inclined plane or element normally recedes, constituting a motion-escapement member, which has the effect and office to relieve the speed-variator from power stress and permit escapement of motion through the relieving member when the speed-variator is in disconnected relation, the relieving member permitting the escape of motion from the source of power for permitting the driven shaft to remain at rest. So arranged the angle of the teeth on the gears will be such that a minimum amount of resistance applied to said shaft 20 will cause cessation of its rotation, on the principle of the angle of resistance is just overcome by the angle of power in the teeth of the gears, as referred to in explaining the principle of my invention in connection with Figs. 1 and 2, the said angle permitting a minimum speed and minimum resistance in the shaft 20 for effecting speed change in the driven member and normally permitting escape of motion through said power-relieving member. Thus illustrating the practical operation of my improved device 1 have found that by providing the gear 14 with teeth having an angle of seventeen and one-half degrees, the gear 15 with teeth having an angle of seventy-two and one-half degrees, the gear 18 with teeth having an angle of twenty-five degrees, and the gear 19 with teeth having an angle of sixty-five degrees an effective device is produced. I figure that the angles stated for the gears mentioned are the substantial equivalents of angles of approximately twelve and seventy-eight degrees in the teeth of the respective gears of a single pair of gears. Thus it may be stated that I have found an angle of twelve degrees in the power-applying element of the relieving member to be an advisable exemplification of my improved device, although I wish this to be distinctly understood as an example, not as a limitation. If the shaft 20 be held stationary, the speed is transferred through the differential gearing to the driven member, the resultant speed in the driven member being one-half the speed of the driving member. If, on the other hand, the shaft 20 be permitted to turn at given speeds for turning the bevel-gear 12 in a direction opposite to the direction of rotation of the driving member, the resultant speed in the driven member will be the difference between the number of revolutions of the driving member and the bevel-gear 12 divided by two, the reducing effect of the jack-in-the-box. Thus if the driving agency revolves two hundred and forty revolutions per minute and the gear 12 revolves seventy-six revolutions per minute the driven agency will make eighty-two revolutions in the same time, whereas if the gear 12 makes two hundred and thirty-four revolutions the driven agency will make three revolutions per minute, which and an infinite amount of other speeds may be obtained in my improved device with minimum resistance and speed in the speed-variator. It will be noted, further, that the bevel-gears 7 8 are, in effect, levers whose power is represented by the bevel-gear 6 and whose fulcrums are represented by the bevel-gear 12. Causing the bevel-gear 12 to recede or turn in a direction opposite to the direction of rotation of the bevel-gear 6 reduces the speed, but, inversely, increases the resultant power of the driven member, without change of gear ratios, under the principle enunciated in explaining Fig. 3, the retreating anchor member 12 being the equivalent of the retreating wedge R and moving in the direction of resistance for increasing the torque of the driven member. It will therefore be seen that the torque of the driven member is dependent on the speed of said driven member, but not primarily on the mechanism which changes this speed.

The speed-variator I have preferred to show consists of a nest of diversely-sized gears 22, fast on the shaft 20, an opposing nest of mating diversely-sized gears 23, fast on a shaft 24, journaled in bearings 25 on the frame, and transmitting-gears 26, arranged to be selectively engaged with the respective mating gears 22 23. The gears 26 are alternately mounted on quadrants 27 27', preferably yoke-shaped. The tines of the yokes take, respectively, to either side of the gears 22 23 and have bearings 28 28' journaled about the shafts 20 and 24, respectively. The tines of the yokes, respectively, also have bearings 29 29' for the studs 30 of the transmitting-gears 26. Rods 31 31' are articulated with the respective quadrants for causing intermeshing of the said transmitting-gears with their respective mating gears. In order to prevent simultaneous meshing of more than one of the transmitting-gears, I have provided each of said rods with a spring 32, one end of which takes against the frame, the other against a knob 33 on the rod for normally raising the transmitting-gears out of mesh. Each of the rods also has lugs 34 35 forming a notch between them. A bar 36 is movable in a slideway 37 on the frame, or the slideway may be on a plate secured to the frame. The bar is provided with a series of notches 38 and projections 39 for the respective rods. A spring 40 normally causes endwise movement of the bar for causing the projections to rest across the path of the lugs. The bar is provided with a handle 41. If it is desired to cause meshing of any of the transmitting-gears, the bar is moved longitudinally against the action of the spring for causing the several notches therein to be in line with the lugs on the rods. The spring on the rod will thereupon cause any one of the transmitting-gears which may have previously been in mesh with the diversely-sized gears to be thrown to normal position out of mesh, the operator's finger depressing any selective rod by pressing on a knob 33, and thereby instantly engaging another transmitting-gear with its mating diversely-sized gears, permitting the new speed to be taken up by the driven member instantly without shock or jar. The bar being released will spring into normal position, causing the projection 39, mating with the lugs on the rod which has just been depressed, to pass between said lugs for holding the intermediate gear connected to said rod in correct mesh with its mating diversely-sized gears and preventing it from being drawn too far into mesh.

I mount a gear 42 on the hub 5 of the driving member, a pinion 43, journaled on a stud 44 on the frame, meshing with the gear 42 and in turn meshing with a gear 45 on the shaft 24, the speed control thereby receiving its initial power from the driving agency, which is preferably a speed factor constant relatively to the driven agency, although it is of course obvious that various speeds may be imparted to it from its source of power, if desired, each new speed, however, becoming in turn a relatively constant factor.

The construction of variable-speed control which I have shown enables me to obtain variation in speed of the driven agency by very small steps without the employment of excessively large gears. My improved device also enables me to employ small gears having small teeth for the speed control because of their being relieved of power-transmitting stress.

The shaft 20 may also be provided with a detent-wheel 46, into the notches 47 of which a finger 48 may engage for locking the shaft. The finger 48 is on a rod 31$^a$. This rod, like the rods 31 31', has a knob 33, spring 32, and lugs 34 35, the bar 36 having a notch 38 and projection 39 for said lugs. To prevent turning of the rod 31$^a$, it may rest in a bearing 49 angular in cross-section. When the finger 48 is engaged in a notch 47, it locks the speed control and the sleeve 13 and causes transmission of all speed to be directly from the driving agent through the jack-in-the-box to the driven agent. By my improved construction accidental lock upon the shaft 20 is also avoided when no transmitting-gear is in mesh with both its mating gears, the motion then being expended in turning shaft 20 as an idler, the driven shaft remaining at rest.

In order to provide ease of movement, I have provided a ball-bearing 49 for receiving the end thrust of the sleeve 13, a ball-bearing 50 for receiving the end thrust of shaft 16 due to the angle of the spiral gears thereon, and a ball-bearing 51 for receiving the end thrust of shaft 20 due to the spiral gear thereon. I have also provided the frame or housing with a depression 52, forming an oil-receptacle for the jack-in-the-box gear, a depression 53, forming an oil-receptacle for the spiral gears immediately controlling the sleeve 13, and a depression 54, forming an oil-receptacle for the speed-variator, and spiral gears 18 and 19, so that those parts may run or dip into oil or have oil trailed to them during operation.

As stated, I relieve the speed control of strain of the power transmission, effecting the speed control by auxiliary devices affecting the main power-transmitting members, which enables me to employ comparatively small gears of narrow face for effecting speed change, affording an exceptionally economical device, very compact in construction, and, further, enables me to avoid the stripping of teeth from gears and the jar incident to the employment of clutches in effecting speed change under load. I am further enabled by my improved device to transmit great power with a large range of speed by a device comparatively small in structure.

Having thus fully described my invention, what I claim as new, and desire to secure by Letters Patent, is—

1. Speed-changing mechanism for power transmission, comprising in combination main power-transmitting means having an anchor member and means for controlling the latter, said latter means consisting of auxiliary speed-changing means and power-retarding means interposed between said auxiliary speed-changing means and said anchor member, said power-retarding means comprising power-applying and power-resisting elements having contacting inclined faces, the angles of said inclined faces being such as to normally cause said power-applying element to drive said power-resisting element.

2. Speed-changing mechanism for power transmission, comprising in combination, substantially as described, main power-transmitting differential gearing including a driving member, a driven member, a rotatable anchor member and having controlling means comprising an auxiliary speed-variator and a power-relieving member interposed between said anchor member and speed-variator; said power-relieving member normally permitting escapement of motion through said power-relieving member from said driving member.

3. A speed-changing mechanism for power transmission, comprising in combination primary power-transmitting means including power-relieving means and auxiliary speed-qualifying means, and releasable locking means acting upon said power-relieving means.

4. In speed-changing mechanism for power transmission the combination of a driving member, a driven member, gearing operatively located between the same, an anchor member, an auxiliary speed-controlling member, spiral gearing having connection with said anchor member and auxiliary speed-controlling member for forming a power-interrupting member therebetween, and a lock for said spiral gearing, substantially as described.

5. In planetary gearing, the combination with the driving member and the driven member, gearing operatively interposed between the same, and an anchor member, of a power-relieving and motion-escapement member acted upon by said anchor member for normally permitting escape of motion therethrough for causing said driven member to be normally at rest, and means controlling said escape of motion.

6. In planetary gearing, the combination, with the driving member and the driven member, gearing operatively interposed between the same, and an anchor member, of a power-relieving and motion-escapement member acted upon by said anchor member for normally permitting escape of motion therethrough for causing said driven member to be normally at rest, means controlling said escape of motion, and a lock acting upon said anchor member.

7. In speed-changing mechanism for power transmission the combination of a driving member, a driven member, gearing therefor, and an anchor member, with a power-retarding member having connection with said anchor member, and a speed-variator qualifying the speed of said power-retarding member, said driven member being normally at rest.

8. In speed-changing mechanism for power transmission the combination of planetary gearing embracing a driving member, a driven member, a rotatable anchor member, a power-relieving member, and a speed-controlling member; said power-relieving member having connection with said anchor member, said power-relieving member and anchor member having contacting inclined faces forming relatively advancing and receding inclines, whereof the advancing incline has an angle of power slightly in excess of the angle of resistance of the receding incline for normally permitting said driven member to be at rest.

9. Speed-changing mechanism for power transmission embracing in combination transmitting means including a driving member, a driven member, a rotatable anchor member, an auxiliary speed-variator, and a power-relieving and motion-escapement member having power-applying and power-receiving rotary contacting inclined faces whose inclines are approximately at an angle of twelve degrees to the rotary axis of the initial power-applying part of said faces, said power-relieving and motion-escapement member being located between said anchor member and said speed-variator, substantially as described.

10. In speed-changing mechanism for power transmission the combination of power-transmitting differential gearing embracing a rotatable anchor member, a power-relieving member having connection with the latter and having power-applying and power-resisting inclined faces whose angle of power application is slightly in excess of their angle of power resistance, and a speed-variator; said speed-variator comprising a plurality of shafts, one of said shafts having connection with a source of power, another of said shafts having connection with said power-relieving member, means between said shafts for changing their relative speed; and a lock for said speed-variator, substantially as described.

11. In speed-changing mechanism for power transmission, the combination of power-transmitting planetary gearing including a driving member, a driven member, an anchor member capable of receding in the direction of resistance applied thereto by said driving member, a speed-variator, and a power-relieving member for said speed-variator operatively interposed between said anchor member and speed-variator; said power-relieving member having advancing and receding rotary inclined contacting faces normally caused to rotate by having said advancing inclined faces of such angle as to normally slightly drive said receding inclined faces, substantially as described.

12. In speed-changing mechanism for power transmission, the combination of power-transmitting differential gearing embracing a driving member, a driven member, an anchor member capable of receding in the direction of resistance applied thereto by said driving member, a speed-variator, and a power-relieving and motion-escapement member for said speed-variator operatively interposed between said anchor member and speed-variator; said speed-variator having a plurality of shafts, groups of diversely-sized mating gears on said shafts, intermediate gears for said respective mating gears, and means permitting said intermediate gears to selectively mesh with their respective mating gears, said driven member being normally at rest, substantially as described.

13. In speed-changing mechanism for power transmission, the combination of power-transmitting differential gearing embracing a driving member, a driven member, an anchor member capable of receding in the direction of resistance applied thereto by said driving member, a speed-variator, and a power-relieving and motion-escapement member for said speed-variator operatively interposed between said anchor member and speed-variator; said speed-variator having a plurality of shafts, groups of diversely-sized mating gears on said shafts, intermediate gears for said respective mating gears, supports for the latter, and means normally retracting said supports, said driving member normally rotating and said driven member being normally at rest, substantially as described.

14. In speed-changing mechanism for power transmission, the combination of a driving member, a driven member, an anchor member, and gearing operatively interposed between the same, said anchor member capable of receding in the direction of resistance applied thereto by said driving member, a speed-variator, and a power-relieving member for said speed-variator operatively interposed between said anchor member and speed-variator, said speed-variator comprising a plurality of shafts, groups of diversely-sized mating gears on said shafts, intermediate gears for said respective mating gears, supports for the latter, a lock for one of said shafts, a keeper for said lock, and means simultaneously normally retracting said supports and keeper, substantially as described.

15. In speed-changing mechanism for power transmission, the combination of a driving member, a driven member, an anchor member, and gearing operatively interposed between the same, said anchor member capable of receding in the direction of resistance applied thereto by said driving member, a speed-variator, and a power-relieving member for said speed-variator operatively interposed between said anchor member and speed-variator, said speed-variator comprising a plurality of shafts, groups of diversely-sized mating gears on said shafts, intermediate gears for said respective mating gears, supports for the latter, rods for the supports, springs for retracting the rods, said rods having lugs, and a slide having indentations for permitting passing of said lugs and projections engaging said lugs, substantially as described.

16. In speed-changing mechanism for power transmission, the combination of a driving member, a driven member, an anchor member, and gearing operatively interposed between the same, said anchor member capable of receding in the direction of resistance applied thereto by said driving member, a speed-variator, and a power-relieving member for said speed-variator operatively interposed between said anchor member and speed-variator, said speed-variator embracing a plurality of shafts, groups of diversely-sized mating gears on said shafts, intermediate gears for said respective mating gears, supports for the latter, a lock on one of said shafts, a keeper for said lock, rods for said supports and keeper, said rods having lugs, and a slide having indentations for permitting passing of said lugs and projections engaging said lugs, and constructed and arranged substantially as described.

In testimony whereof I have signed my name hereto in the presence of two subscribing witnesses.

ADOLPH L. DE LEEUW.

Witnesses:
HENRY TABLER,
JAMES FITTON.